Feb. 4, 1969 O. J. ADLHART ET AL 3,425,875
METHOD OF PREPARING FUEL CELL ELECTRODE CONTAINING
FLUOROCARBON POLYMER AND CARBON BLACK-SUPPORTED
PLATINUM GROUP METAL

Filed Sept. 15, 1966

Binder and Carbon
Black-Supported
Platinum Group Metal

Binder and Carbon
Black-Supported
Platinum Group Metal

INVENTORS
Otto J. Adlhart
Carl D. Keith
George R. Pond
ATTORNEY

A—CHANNEL BLACK I
B—OIL FURNACE BLACK I
C—OIL FURNACE BLACK II
D—CHANNEL BLACK III
E—CHANNEL BLACK II
F—ACTIVATED CARBON OF PRIOR ART

INVENTORS
Otto J. Adlhart
Carl D. Keith
George R. Pond
Robert S. Honor
ATTORNEY

United States Patent Office 3,425,875
Patented Feb. 4, 1969

3,425,875
METHOD OF PREPARING FUEL CELL ELECTRODE CONTAINING FLUOROCARBON POLYMER AND CARBON BLACK-SUPPORTED PLATINUM GROUP METAL
Otto J. Adlhart, Newark, Carl D. Keith, Summit, and George R. Pond, Newark, N.J., assignors to Engelhard Industries, Inc., Newark, N.J., a corporation of Delaware
Continuation-in-part of application Ser. No. 428,788, Jan. 28, 1965. This application Sept. 15, 1966, Ser. No. 579,775
U.S. Cl. 136—122     2 Claims
Int. Cl. H01m 27/10

ABSTRACT OF THE DISCLOSURE

A method for the preparation of fuel cell electrodes consisting of an admixture of a fluorocarbon polymer binder and a carbon-black-supported platinum group metal catalyst on a supporting substrate which method involves the use of a carbon black of specific properties and preparation of the electrode under conditions which permit sintering, but avoid fusion, of the binder.

---

This is a continuation-in-part of application Ser. No. 428,788, filed Jan. 28, 1965, now abandoned. The invention described herein relates to fuel cells and more particularly to fuel cells equipped with fuel cell electrodes of improved performance. Additionally this invention relates to the new and improved fuel electrode per se, and the production of electrical energy utilizing a fuel cell equipped with such fuel electrode.

Fuel cells are well known as devices for the direct conversion of fuel to electrical energy. A fuel cell basically comprises a fuel electrode and an oxidizer electrode. A true fuel cell is distinguished from other primary batteries in that fuel is continuously or intermittently supplied to the cell and its electrodes are not consumed.

The reactions occurring at fuel cell fuel electrodes, for instance the conversion of carbonaceous fuels to carbon dioxide or the oxidation of hydrogen to protons at the fuel electrode, have best been catalyzed heretofore by platinum group metals, e.g. Pt, Ru, Pd, Ir, Os. For efficient utilization of these precious metals, carriers or substrates are preferably employed to provide such metals in a highly dispersed form. Activated carbon, for example, has been utilized heretofore as support for catalysts for fuel cell electrodes. Activated carbon is characterized by a high surface area and high porosity, characteristics normally considered highly desirable for catalyst supports. However after appreciable research and experimental work, we concluded that the high surface area high porosity characteristics of the prior art activated carbon-supported catalysts were responsible for causing severe diffusion and mass transfer limitations on the catalytic fuel electrode which resulted in a materially lower level of catalytic activity of the electrode and a markedly higher polarization of such electrode.

Heretofore fuel cell electrodes have been prepared by depositing the catalytic metal directly on a carbon supporting substrate in the form of a plate or sheet, with the carbon usually in the form of graphite. An activated carbon has also been deposited on the graphite supporting substrate prior to deposition of the catalytic metal thereon. Such electrodes suffer from the carbon supporting substrate having to be too thick, typically of ¼" thickness, for purpose of physical strength to enable a high rate of diffusion of the fuel or oxidizer to the electrolyte contacting the catalyst.

The passage of liquid electrolyte into the larger pores of the electrode results in the problem known as flooding the pores. When flooding occurs, the desired electrochemical reaction at the electrode concerned is either considerably reduced or terminated.

In accordance with the present invention, a new and improved fuel cell fuel electrode is provided characterized by exhibiting a materially higher level of catalyst activity and a materially lower polarization than that provided by the prior art fuel cell electrodes having as catalyst support the high surface area, high porosity carrier, such as activated carbon. The fuel electrode herein is sufficiently hydrophobic to greatly reduce the pore-flooding problem and exhibits good thermal stability. The anode of this invention comprises a thin porous supporting substrate, and bonded to the supporting substrate and on surfaces of pores thereof a mixture of a carbonaceous binder material and a carbon-supported platinum group metal as catalyst. The carbon is a carbon black of low porosity, and surface area in a particular range lower than commonly found in activated carbon chars. Carbon black is normally described as an elemental carbon differing from cokes and charcoals by being particulate, composed of nearly spherical particles, showing varying extents of graphite structure, and of collodial dimensions, i.e. less than about 400 m$\mu$ in diameter.

The porous supporting substrate or base of the electrode of this invention can be an electronically conductive or substantially non-conductive porous substrate. The supporting substrate is of thickness preferably no more than 50 mils thickness, more preferably from about 10–30 mils thickness, to enable a high diffusion rate of the fuel therethrough to the electrolyte. The electronically conductive porous substrates are, for instance, woven metal screens, e.g. of platinum or stainless steel with the screen mesh openings serving as the pores. Exemplary of the electronically substantially non-conductive porous substrates are porous sheets or plates of, for instance, polyvinyl chloride or polytetrafluoroethylene particles or of organic fibers, e.g. acrylonitrile fibers or vinylidene chloride fibers, or inorganic fibers, e.g. glass fibers or asbestos fibers. The supporting substrate or base is a non-carbon base, i.e. not fabricated of carbon or graphite.

The carbon black supports of this invention have particular porosity characteristics, and a considerably lower surface area and particle size than found in the prior art activated carbon catalyst supports. The data of Table I hereafter set forth, sets out physical properties including the surface area, porosity and particle size of carbon black supports of this invention, the prior art activated carbon, and the inferior carbon blacks of high surface area and small particle size.

TABLE I

| Support | Surface area, m.²/g. | Porosity, cm.³/g.[1] | Average particle size diameter in m$\mu$ |
|---|---|---|---|
| Carbon black–I | 73 | 0.147 | ~70 |
| Activated carbon of prior art | 958 | 0.65 | ~15,000 |
| Oil furnace black I | 119 | 0.17 | 25 |
| Oil furnace black II | 286 | 0.21 | 29 |
| Channel black I | 147 | 0.13 | 22 |
| Channel black II | 1,002 | 0.62 | 9 |
| Channel black III | 497 | 0.40 | 14 |

[1] Cumulative to 30.0 m$\mu$ pore diameter.

The carbon black supports of this invention are characterized by having a surface area in the range of about 50–350 square meters per gram and a porosity (pore volume cumulative to 30.0 m$\mu$ pore diameter) no more than 0.4 cubic centimeters per gram, preferably 0.1 to 0.3 cubic centimeters per gram. The carbon blacks are preferably from about 10–100 m$\mu$ and most preferably about 15 to 40 m$\mu$ in diameter.

As indicated above, the particular porosity characteristics of the carbon black support useful according to this invention is an important feature of the present discovery. These carbon blacks possess a special relation between their pore diameter and total pore volume. FIGURE 3 represents a plot showing the porosity characteristics for the carbons of Table I. The carbon blacks useful in obtaining the desirable fuel cell electrode characteristics now made possible are designated Channel Black I, Oil Furnace Black I and Oil Furnace Black II. Those carbons unsuitable in obtaining the improved fuel cell electrodes are labelled Channel Black II, Channel Black III and activated carbon of prior art.

The difference between the porosity characteristics of the desirable and undesirable carbons is immediately recognized from FIGURE 3. As has been earlier indicated the carbon blacks with which this invention is concerned have a pore volume cumulative to 30 m$\mu$ pore diameter of up to about 0.4 cubic centimeters per gram. It is preferred, however, that such pore volume (porosity) be about 0.1–0.3 cc./g. Of those pores smaller than 2 m$\mu$ in diameter, a porosity less than 0.05 cc./g. and preferably less than 0.02 cc./g. is desired. The carbon black particles with pore diameters between 2 and 4 m$\mu$ desirably have a cumulative pore volume of about 0.02–0.1 cc./g. The carbon particles of the desirable carbon blacks having a pore diameter of about 4 m$\mu$ to about 30 m$\mu$ may have a cumulative pore volume less than about 0.3 cc./g. and preferably about 0.08–0.2 cc./g.

The data for FIGURE 3 were obtained using an Isorpta instrument for continuous flow determination of pore size distribution as previously described in U.S. Patent 3,211,066. Samples of carbon black or activated carbon were placed in stainless steel tubes with an inside diameter of about ¼″, about 0.2 to 0.5 gram of sample being used. A glass wool wick was used to minimize back pressure. As carbon black is composed generally of nearly spherical particles having variable internal porosity, the pore volumes measured by the Isorpta instrument for the carbon blacks include both the spaces between the particles and internal porosity. The inter-particle "pore volumes" may increase as carbon black particle sizes become smaller.

The desired carbon blacks appear from FIGURE 3 to have smaller inter-particle and internal "pore volumes" in small size range, i.e. less than 4 m$\mu$ diameter, especially less 2 m$\mu$ diameter, than do the less desirable carbon blacks. As regards inter-particle "pore volume," low values in small size ranges are related to larger particle size of the desired carbon blacks as indicated in Table I. In consequence, since the platinum metal catalyst is quite evenly dispersed over the interior and exterior carbon black surfaces, the desired carbon blacks are believed to have a larger proportion of the available platinum metal on the surfaces of larger pores, e.g. 4 to 30 m$\mu$ in diameter. Such larger pores make the catalyst metal more accessible and permit better mass transfer of fuel and oxidant to catalyst and electrolyte than the small pores. Catalyst metal in such small pores is only partially utilizable, accounting to some extent for the inferiority of the less desirable carbon blacks.

The carbon black supports of this invention of Table I are obtainable in commerce, for example under the trademark names "Shawinigan Black," "Regal 330R," "Vulcan XC–72R" and "Monarch 81." The carbon blacks with which this invention is concerned can be produced by the incomplete combustion of normally gaseous hydrocarbons, for instance methane, and liquid hydrocarbons, for instance n-hexane and heptane and preferably have an electrical resistivity in packed condition of about 2 ohm-cm. or less. The electrical resistivity is determined under a compaction pressure of 10 atmospheres. Carbon blacks are tested for electrical resistivity by placing the carbon powders in a circular hole of about 0.3 cm.$^2$ cross section in a heavy-walled insulating Lucite ring. Steel plungers are wired to a source of electric current, hold the powder in place, and transmit the compaction pressure to the powder. Lucite caps serve to insulate the plungers from the press and to convey the pressure to the plungers. The electrical resistivity of the powder at 10 atmospheres compaction is then determined.

The surface areas and porosity of Table I were obtained by low-temperature nitrogen adsorption on the particular support material. The particles sizes given for the carbon blacks are as reported by the manufacturer. The prior art activated carbons have rather broad size ranges, generally over 90% between 1000 m$\mu$ and 50,000 m$\mu$.

The catalyst herein may be prepared by slurrying the carbon blacks with which this invention is concerned in fine powder form, with an aqueous solution of a salt of the particular platinum group metal or metals desired as catalyst, for instance the chloride of such metal. The platinum group metal is then precipitated, or when combinations of platinum group metals are used co-precipitated onto the carbon particles from their respective chlorides by addition of alkali, for instance aqueous caustic, to the slurry. The mixture is then treated with a reducing agent, washed free of chlorine ion, and dried. If desired, the catalysts can be further treated by heating in a stream of $H_2$ at elevated temperature.

The concentration of catalytic metal in the supported catalyst is usually within the range of, by weight, about 25%–75%, based on the total catalyst (i.e. carbon black support plus catalytic metal). It is desired that the catalyst have a metal:carbon ratio by weight of about 1:20–20:1 preferably 1:5–2:1.

The carbonaceous binder materials consist of discrete particles of size larger than the carbon black particles, and suitably between about 50 and 1000 m$\mu$. They are inert under the conditions of use and minimize electrode wetting and flooding problems. These binders in general exhibit some plasticity, particularly when sintered, which assists in their being bonded without deformation to porous substrate and carbon black particles. The relation of the particle size of the carbonaceous binder to the carbon black provides in effect a lattice with the carbon black-supported catalyst particles in the spaces between the binder particles, Such structure makes possible larger openings for improved mass transfer of gaseous fuel or oxidant to the three-phase boundary of the fuel or oxidant, the liquid electrolyte, and the solid catalyst surface.

Carbonaceous binder materials that are suitable include such polymers as polyfluorocarbons, silicones and polyolefins such as polyethylene. Silicones or polyolefins may be satisfactory, for example, with alkaline electrolytes or at temperatures below 100° C. However, for the broad range of conditions the fluorocarbon polymers e.g., polytetrafluoroethylene, polytrifluorochloroethylene, and polytrifluoroethylene, copolymers of different fluorocarbon monomers, e.g., copolymers of hexafluoropropylene and tetrafluoropropylene, and the like are preferred. Polytetrafluoroethylene is especially preferred. These fluorocarbon polymers are obtainable in commerce.

The carbonaceous binder particle and carbon black supported-platinum group metal particle mixture can be applied to the porous supporting substrate herein by pressing the mixture of carbonaceous binder powder and powdered carbon black supported catalytic metal by means of a hydraulic press or another suitable pressing device into the porous supporting substrate to embed and form a thin surface coating or layer thereon and also to force a portion of the particle mixture into the pores in the interior of the porous substrate. The coated substrate may then be sintered as hereinafter discussed. Another method suitable for applying a mixture of carbonaceous binder and carbon black supported platinum group metal catalyst onto the supporting substrate is by first mixing together an aqueous dispersion or emulsion of the binder, e.g. an aqueous emulsion of polytetrafluoroethylene, and the carbon black supported-platinum group metal powder particles, typically in the proportions of about 50 weight percent of such fluorocarbon aqueous emulsion and 50 weight percent of the carbon black-supported platinum group metal, and then applying the resulting mixture, for instance by brushing or pouring, onto the surface of the porous supporting substrate. The amount of carbonaceous binder in admixture with the carbon black supported catalyst may range between about 5% and 95% by weight. If desired a partial vacuum can be applied to the opposite face of the porous substrate during the coating to obtain deeper penetration of the dispersion into the porous substrate. The application can be repeated a plurality of times with or without the vacuum to assure the desired penetration into the pores of the substrate. The thus-coated substrate is then dried by heating at a temperature of about 50° C., followed by sintering in a reducing atmosphere, for example nitrogen, carbon dioxide or an annealing gas mixture, such as 93% $N_2$ and 7% $H_2$, by heating at an elevated temperature of typically about 250° C. The binder particles in an aqueous emulsion are typically of a size of about 150–200 millimicrons. A major portion of the pores of the electronically conductive and non-conductive supporting substrates herein are of appreciably greater diameter than both the diameter of the binder and the diameter of the carbon black-supported platinum group metal catalyst fine powder particles of this invention, such pores frequently having diameters of 50 microns or more. The finely-divided supported catalyst particles of this invention are usually of size such that all or substantially all particles will pass a 325 mesh sieve (U.S. Standard) with 44 micron openings, whereby the finer binder particles admixed with the carbon-supported catalytic metal fine particles are permitted to pass into such size pores of the supporting substrate. The resulting coated substrate has a thin coating of the binder and carbon black-supported platinum group metal particles adhered onto the surface of the porous supporting substrate, and on the surfaces of pores therewithin. The total catalyst plus carbonaceous binder thickness on the electrode is preferably about 0.1–0.3 mm. Although the binder is highly effective in securing or holding the carbon black-supported platinum group metal particles in place within the pores of the supporting substrate, the coating formed therewith is permeable to ionic and electrolytic movement or transport in the cell. When woven metalic screen is the supporting substrate, the pores are the mesh openings or interstices between the warp and weft strands of the screen.

Aqueous dispersions of polytetrafluoroethylene are obtainable in commerce. Such dispersions and also aqueous dispersions of the other carbonaceous binders disclosed herein can be prepared by mixing together the binder particles of appropriate diameter and an aqueous liquid medium with an added non-ionic wetting agent, for instance a polyethylene p-octyl phenol ether which is obtainable under the trademark name "Triton X–100."

The fuels utilizable herein may be organic or carbonaceous fuels and hydrogen. Pure or impure hydrogen can be employed. The impure hydrogen can be obtained by steam reforming of hydrocarbons and may contain some carbon monoxide. Exemplary of organic or carbonaceous fuels are lower alkanols, e.g. methanol and ethanol, and acyclic saturated aliphatic hydrocrabons, e.g. propane, ethane and butane.

The electrolytes used depend on the particular fuel cell design and the particular fuel, as is well known to those skilled in the art. Exemplary of the electrolyte are acid electrolytes, for instance aqueous solutions of sulfuric acid or phosphoric acid; and neutral or substantially neutral electrolytes, for instance a concentrated aqueous solution of cesium bicarbonate which at temperatures above 125° C. rejects carbon dioxide. With carbonaceous fuels the electrolyte used is one free of any free base, i.e. containing no or substantially no free base. It is important the electrolyte be free of free base when a carbonaceous fuel is used, as the presence of any appreciable quantities of free base therein will result in the reaction therewith of the $CO_2$ formed during the oxidation of the fuel, and cause deleterious affect on the electrolyte. With hydrogen as fuel, an alkaline electrolyte, e.g. aqueous KOH or NaOH solution, can be utilized, and the acid or neutral electrolyte disclosed supra can also be utilized.

The fuel cells of this invention can be operated at ambient temperatures up to about 300° C. Heat may be applied from an outside source for start-up for elevated temperature operation and, if necessary, during the course of the cell operation, for instance by steam supplied to a suitable steam jacket. The temperature of the cell may be controlled, for instance by means of the amount of insulation material utilized, or by circulation of cooling air or other cooling gas about the cell.

Reference is made to the accompanying drawings wherein FIGURE 1 and FIGURE 2 are set out.

Figure 1:
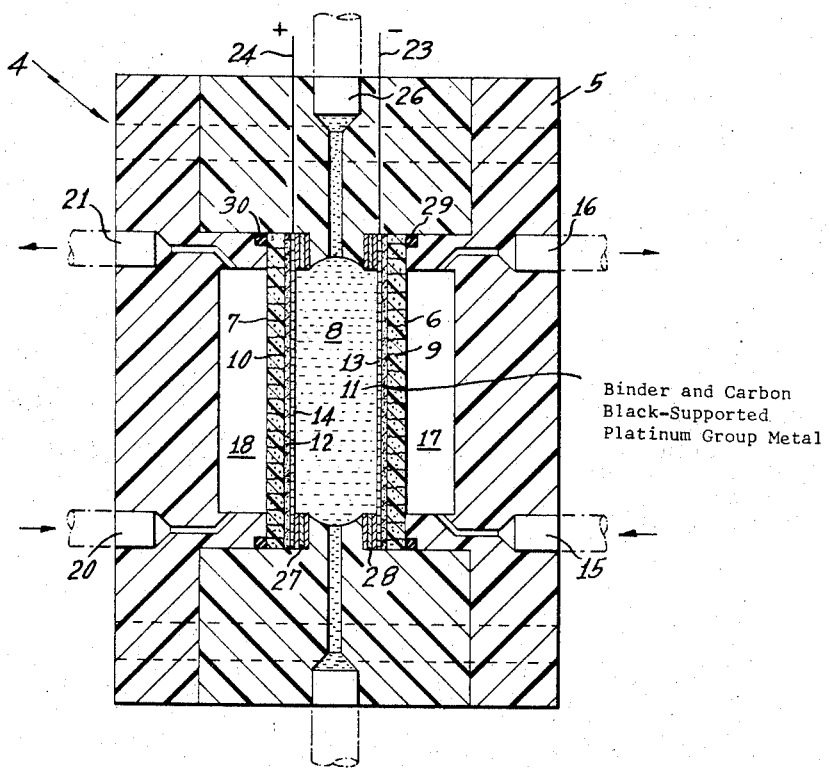
FIGURE 1 is a longitudinal section through a fuel cell of this invention.

tivity, porous electrodes 6 and 7 of opposing polarity therein and respectively the fuel electrode and oxidizer electrode, and liquid acid electrolyte 8 contacting opposed surfaces of electrodes 6 and 7. Electrodes 6 and 7 are each made up of a porous non-catalytic supporting substrate 9 and 10 respectively of low electrical conductivity, for instance a sheet of porous "Teflon" sponge. Fuel electrode 6 is gas pervious and has bonded to the surface of porous substrate 9 and also to surfaces of pores in the interior of substrate 9 a substantially uniform thickness permeable layer or coating of the carbonaceous binder with the carbon black supported-platinum group metal fine particles bonded or secured therein as catalyst. Gas pervious oxidizer electrode 7 has a substantially uniform layer 12 of a particulate platinum group metal as catalyst adhered to its porous supporting substrate 10 with a portion of such catalyst being in pores in the interior support 11. A three phase boundary of catalyst, electrolyte and gaseous fuel is provided in the pores of substrate 9 of fuel electrode 6, where the catalyst surface contacts the menisci of the electrolyte and the gaseous fuel. For collection and withdrawal of electrons, a current collector such as single ply platinum gauze sheet 13 is in face to face contact with catalyst layer 11, and single ply platinum gauze sheet 14 is in face to face contact with catalyst layer 12 for supplying electrons to the oxidizer electrode for the electrochemical reaction with the oxygen. The connection to the conventional reference electrode (not shown) is designated at 26. Annular members 27 and 28 of, for example, gold and O-rings 30 and 29 of for instance, neoprene rubber, serve to respectively maintain the gauze sheets 14 and 31 in contact with the catalyst layers and to seal the assembly.

Fuel inlet and outlet 15 and 16 respectively enable supply of fuel in gaseous form into anode compartment 17 and the outflow of gaseous reaction products from such compartment.

An oxidizing gas is introduced into cathode compartment 18 through inlet 20 and the cathode effluent evolves through outlet 21. Exemplary of such gas is an oxygen-containing gas, e.g. air, or oxygen per se.

Figure 2:
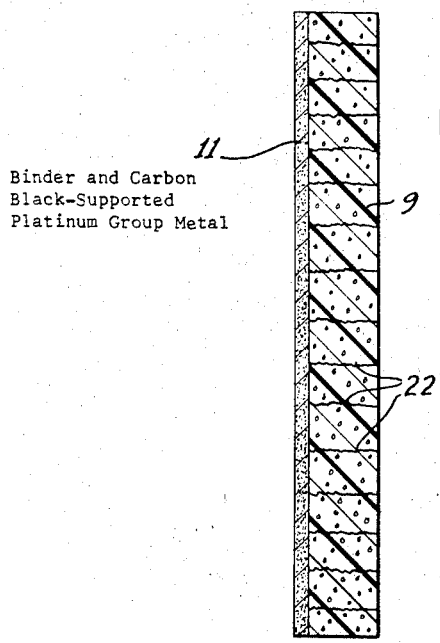
FIGURE 2 is an enlarged section through a fuel electrode of this invention.
Figure 3:
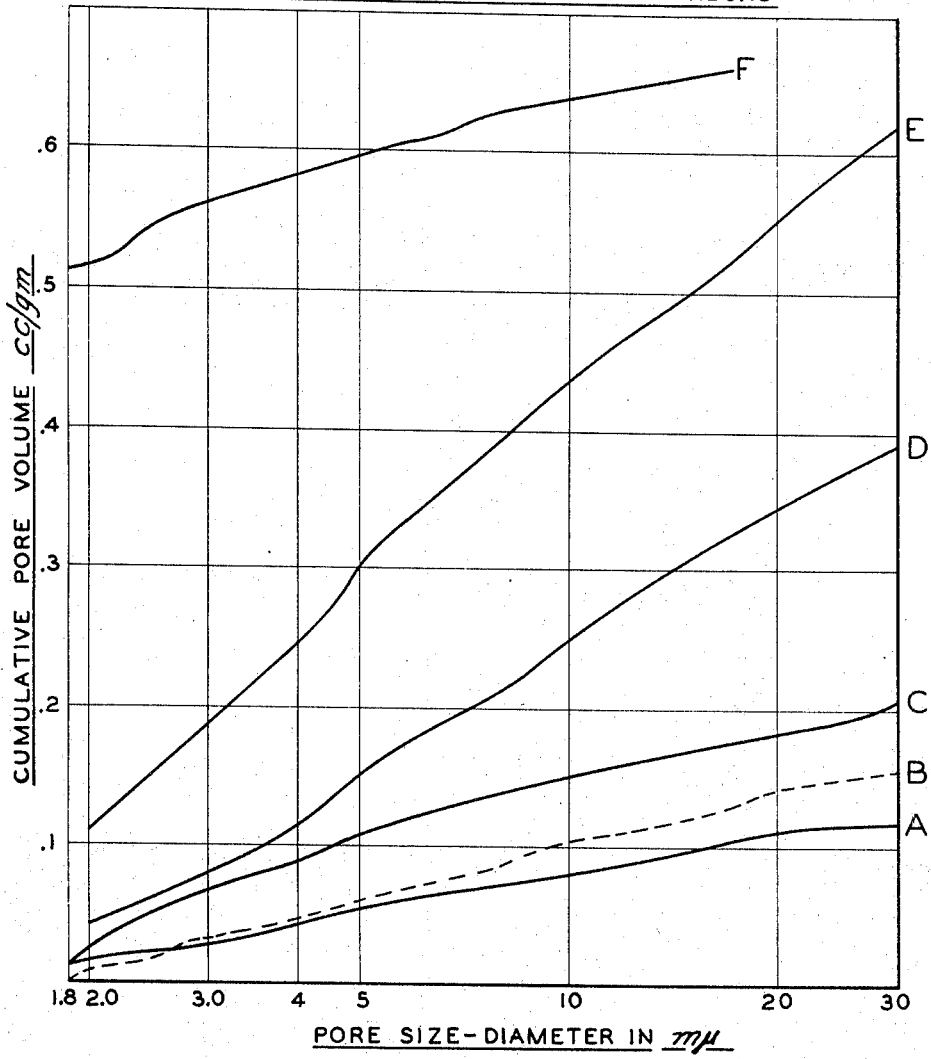

One fuel electrode of this invention is shown in more detail in FIGURE 2. Pores 22 of porous supporting substrate 9 of, for example, "Teflon" communicate opposite sides of substrate 9. Bonded to the surface of supporting substrate 9 is permeable layer 11 of carbonaceous binder and the carbon black supported-platinum group metal particle secured therein as catalyst. Such layer of binder and carbon black supported-platinum group metal particles is also on walls of pores in the interior of substrate 9. An electron collecting and withdrawal member such as the platinum gauze sheet 13 shown in FIGURE 1 will contact catalyst layer 11 for the purpose stated.

Electrically conductive elements 23 and 24 are connected to the upper portion of the current collectors 13 and 14 respectively. Conductive elements 23 and 24 are connected in circuit with a suitable resistance, for instance an incandescent lamp (not shown), and the flow of current in such circuit due to the flow of electrons resulting from the electrochemical reaction within the fuel cells results in the lamp being energized and lighting up.

The invention is further illustrated by the following examples which are intended for the purpose of illustration and not for limitation. In Example I the carbon blacks set out in Tabe I hereinbefore are evaluated as support for a platinum group metal as catalyst for a fuel electrode by a half cell evaluation procedure. This procedure is especially convenient for rapid and unambiguous determination of differences in anode polarization, as any limitations due to cathode polarization or resistance polarization are eliminated. Such a half cell evaluation procedure is described in J. Electrochem. Soc. 109, 553 (1962). The half cell method used to evaluate the catalysts of this invention is similar except a dynamic hydrogen reference electrode is used instead of the calomel electrode. This type of hydrogen reference electrode is described by Giver in J. Electrochem. Soc. 111, 376 (1964). Percentages are by weight unless otherwise specified.

EXAMPLE I

A catalyst comprising 35% platinum and 15% ruthenium on the carbon black I particles of Table I previously set forth herein characterized by the low surface area and porosity and of the particle size disclosed was prepared by slurrying 10 parts of carbon black I in an aqueous solution containing 7 parts of platinum metal as potassium chloroplatinate (II) and 3 parts of ruthenium metal as ruthenium chloride and co-precipitating the platinum metals on the carbon black by treatment of the mixture with alkali. The resulting supported catalyst was then reduced, washed, and dried. Sieved samples of the product carbon black-supported catalyst passing a 400 mesh sieve were mixed with polytetrafluoroethylene powder of the trademark name "Teflon" and of particle size passing a 50 mesh sieve. The mixture containing about 70% by weight of "Teflon" and about 30% of the carbon black-supported platinum and ruthenium was pressed in a thin substantially uniform layer at a pressure of 1000 p.s.i. onto an 80 mesh platinum screen as supporting substrate to form the fuel electrode.

An activated carbon-supported catalyst containing 35% platinum and 15% ruthenium supported on activated carbon particles with the activated carbon of the prior art (of Table I hereinbefore set forth) was prepared by a similar procedure as utilized to prepare the carbon black I supported catalyst of the first paragraph of this example. A fuel electrode having an 80 mesh woven platinum screen as supporting substrate, and having the mixture of activated carbon-supported catalytic metal and polytetrafluoroethylene pressed as a thin, substantially uniform layer onto the screen, was prepared by a procedure similar to that utilized for preparing the fuel electrode referred to in the first paragraph of this example.

The half cell used for testing the catalysts was operatively connected to a counter electrode of platinum screen. The electrolyte was 2 N $H_2SO_4$ aqueous solution and the fuel was 2 volume percent $CH_3OH$ dissolved in the electrolyte. The following Table II sets forth the test results at a cell operating temperature of 90° C.

TABLE II

| Fuel electrode catalyst | Potential in volts vs. hydrogen electrode at indicated current density in ma./cm.$^2$ | | | | |
|---|---|---|---|---|---|
| | 0 | 20 | 30 | 100 | 200 |
| Activated carbon-supported Pt and Ru | .08 | .22 | .26 | .34 | .42 |
| Carbon black-I supported Pt and Ru | .07 | .21 | .24 | .31 | .37 |

The superiority of the carbon black-I-supported catalyst of this invention as fuel electrode catalyst over the activated carbon-supported catalyst of higher surface area and different porosity characteristics is shown by the data of Table II. The catalyst loadings on the platinum screen of the fuel electrode used in each of the test runs of Table II were about 16 mg. of the Pt plus Ru per square centimeter of screen surface.

Example II

An electrode containing as catalyst platinum metal supported on carbon black-I powder (of Table I) bonded in polytetrafluoroethylene on the electrode supporting substrate, and an electrode containing as catalyst platinum black particles with no carbon carrier bonded in polytetrafluoroethylene on the electrode supporting substrate were separately tested as fuel electrodes by a procedure similar to that utilized in Example I supra. The first-mentioned electrode was prepared by mixing together 50 weight percent of the particulate carbon black-supported platinum and 50 weight percent of an aqueous emulsion of polytetrafluoroethylene obtained in commerce. Such emulsion had a polytetrafluoroethylene concentration of about 50%. The mean fluoro carbon polymer particle size was about 150–200 mµ. The resulting suspension was brushed into a sheet of porous "Teflon," followed by drying at 50° C. and sintering in an atmosphere of a gas containing about 93% $N_2$ and about 7% $H_2$ at 250° C. The platinum black-containing electrode was prepared by a similar procedure to that set forth immediately above, however, only 25% by weight of polytetrafluoroethylene was added to the catalyst. The remainder was platinum black.

The electrolyte was 7.5 N $H_2SO_4$, the cell operating temperature was 80° C. and the fuel was technical grade hydrogen.

The results of the test runs are set forth in Table III which follows:

TABLE III

| Catalyst (weight percent) | Catalyst metal loading (mg. Pt/cm.$^2$ electrode area) | Mv. vs. hydrogen reference electrode at indicated current density in ma./cm.$^2$ | | |
|---|---|---|---|---|
| | | 50 | 100 | 200 |
| Pt (50) carbon black-I (50) | 2 | 5 | 10 | 15 |
| Pt. black | 6 | 7 | 17 | 37 |

The Table III test data show the superior activity of the carbon black-I-supported Pt metal catalyst of this invention to unsupported Pt black as catalyst. Even at a catalyst metal loading of but 2 mg. Pt/cm.$^2$, the carbon black-supported Pt metal catalyst showed performance superior to that of the unsupported Pt black catalyst.

Example III

To an aqueous solution containing 19 parts by weight of platinum metal as potassium chloroplatinate (II) and 1 part of ruthenium metal as ruthenium chloride is added an aqueous slurry containing 20 parts by weight carbon black. The metal is precipitated on the carbon black by treatment with sodium hydroxide. The supported catalyst which results is reduced, washed, and dried. The particles are passed through a 200 mesh sieve (U.S. Standard) and then mixed with a polytetrafluoroethylene emulsion containing one part of the binder for every two parts of the metal and carbon by weight. The polytetrafluoroethylene has an average diameter of about 150–200 mµ. The thick suspension formed is brushed onto an anode having a substrate of porous "Teflon." A total of 2.5 mg./cm.$^2$ platinum metal catalyst is applied. The catalyst mixture is then sintered at 230–250° C. for about 2 hours in a carbon dioxide atmosphere. The electrodes are then pressed at 600 p.s.i.

A half cell such as described in J. electrochem. Soc. 109, 553 (1962), except that a dynamic hydrogen reference electrode is used in place of the calomel electrode, was connected using the prepared fuel electrode. Phosphoric acid (85%) was used as the electrolyte and the cell was operated at 152°–154° C. using propane as the fuel. The following results were obtained.

TABLE IV

| Carbon | Potential vs. hydrogen electrode (ma./cm.$^2$) | | | |
| --- | --- | --- | --- | --- |
| | 20 | 30 | 50 | Approx. $i_L$ [1] |
| Oil furnace black I | 0.29 | 0.33 | 0.39 | 80 |
| Oil furnace black II | 0.29 | 0.33 | 0.39 | 75 |
| Channel black I | 0.29 | 0.33 | 0.40 | 65 |
| Channel black III | 0.31 | 0.36 | 0.45 | 55 |
| Channel black II | 0.33 | 0.39 | | 45 |

[1] Approx. $i_L$ is the current at which polarization increases so that stable potential cannot be maintained as oxygen evolution begins.

The above data clearly points out the advantages of using the carbon black supported catalyst of the present invention (first 3 listed) over the systems otherwise similar but using carbon blacks without the scope of this invention.

What is claimed is:
1. A method for the preparation of a fuel cell electrode consisting of a thin porous supporting substrate having bonded thereto a mixture of a fluorocarbon polymer and a carbon black-supported platinum group metal as catalyst which method comprises admixing a catalyst comprising a platinum group metal supported on a carbon black having a surface area in the range of about 50–350 meters$^2$/gm., a pore volume cumulative to a 30 m$\mu$ pore diameter of no more than 0.4 cubic centimeters per gram and particle size of from about 15–40 m$\mu$ in diameter with an aqueous dispersion of a fluorocarbon binder having a particle size between about 50 and 1000 m$\mu$, said binder being employed in an amount of from 25–75% by weight based on the total weight of binder plus catalyst, coating the support with said admixture and heating the coated support to the sintering temperature of the fluorocarbon binder but below about 250° C.

2. The method of claim 1 wherein the fluorocarbon binder is polytetrafluoroethylene.

References Cited

UNITED STATES PATENTS

| | | | |
| --- | --- | --- | --- |
| 3,098,772 | 7/1963 | Taschek | 136—120 |
| 3,223,556 | 12/1965 | Cohn et al. | 136—86 |
| 3,236,693 | 2/1966 | Caesar | 136—86 |
| 3,252,839 | 5/1966 | Langer et al. | 136—86 |

WINSTON A. DOUGLAS, *Primary Examiner.*

O. CRUTCHFIELD, *Assistant Examiner.*